United States Patent [19]

Henrion

[11] 4,141,017
[45] Feb. 20, 1979

[54] THERMAL PRINTER HAVING EXPANDED CHARACTER SET THERMAL PRINTHEAD

[75] Inventor: W. S. Henrion, Houston, Tex.

[73] Assignee: Texas Instruments Incorporated, Dallas, Tex.

[21] Appl. No.: 765,324

[22] Filed: Feb. 3, 1977

[51] Int. Cl.² ............................................. G01D 15/10
[52] U.S. Cl. ................................. 346/76 R; 219/216
[58] Field of Search ...................... 346/76 R; 219/216; 197/1 R; 101/1; 340/324 M

[56] References Cited

U.S. PATENT DOCUMENTS

| | | | |
|---|---|---|---|
| 3,312,979 | 4/1967 | Torre | 346/76 R |
| 3,700,852 | 10/1972 | Ruggiero | 219/216 |
| 3,988,569 | 10/1976 | Henrion | 346/76 R X |
| 4,044,346 | 8/1977 | Akahane | 340/324 M |

Primary Examiner—Joseph W. Hartary
Attorney, Agent, or Firm—Rene' E. Grossman; Thomas G. Devine

[57] ABSTRACT

A thermal printer has a thermal printhead having coincident current-activated semiconductor mesas arranged to a matrix, the number of mesas being greater than the number of x and y drive lines. The printhead has a decoder formed thereon and a number of coincident current lines equal to the number of mesas. The input to the decoder comes from the x and/or y drive lines and selects coincident current lines to provide desired characters according to coded input signals.

7 Claims, 5 Drawing Figures

THERMAL PRINTER HAVING EXPANDED CHARACTER SET THERMAL PRINTHEAD

BACKGROUND OF THE INVENTION

1. Field of the Invention

This invention relates to thermal printers and more specifically to coincident current activation of semiconductor mesas forming a thermal printhead when there are more mesas than x and y input drive lines.

2. Description of the Prior Art

In the past, semiconductor mesas of thermal printheads were typically activated by a single signal provided on a single conductor to each mesa. For example, a 5×7 mesa printhead required a total of 35 input lines.

More recently, the mesas of a thermal printhead have been provided with a latching heater circuit for providing a hot spot at the surface of the mesa, the latching circuit being responsive to a pair of coincident currents provided on a pair of intersecting coincident current lines, the mesas being arranged in a matrix requiring two signals for activation. In this manner, a 5×7 mesa array is activated by a total of 12 input drive lines.

This invention permits the use of a thermal printhead having more mesas than input drive lines by providing a decoder formed on a printhead with input drive lines connected to the input thereof and coincident current lines connected to the output. By properly coding the input drive lines, desired coincident current lines are selected to activate the appropriate latching heater circuits of desired mesas to form a selected character. For example, a thermal printer that has a 5×7 mesa thermal printhead may have the 7×9 mesa thermal printhead of the preferred embodiment of this invention substituted therefor without a need for increasing the number of input drive lines from 12 to 16.

BRIEF SUMMARY OF THE INVENTION

A thermal printhead has a matrix array of x+a and y+b mesas formed thereon. A corresponding number of coincident current lines is provided. Each mesa contains a heater circuit which comprises a latching circuit which, when turned on, remains on even though the input signals provided on the coincident current line are removed. This permits selection of each desired mesa using coincident currents. Each mesa has a heating resistor for providing a hot spot at the upper surface of the mesa.

Coded signals are provided from a read-only memory and are amplified through appropriate driver circuits and sent to the printhead to select mesas to form characters according to the code transmitted. Some or all of the coded signals are applied to a decoder which enables the selection of more coincident current lines than drive lines connected to the decoder. In this fashion, a printhead having more mesas than input drive lines from a thermal printer is provided.

a primary object of this invention, therefore, is to provide a thermal printhead for a thermal printer having a larger number of mesas than input drive lines.

It is another object of this invention to provide a thermal printhead for a thermal printer which enables the printing of odd character sets and improved font.

These and other objects will be made evident in the detailed description that follows.

DETAILED DESCRIPTION OF THE INVENTION

Figure 1:
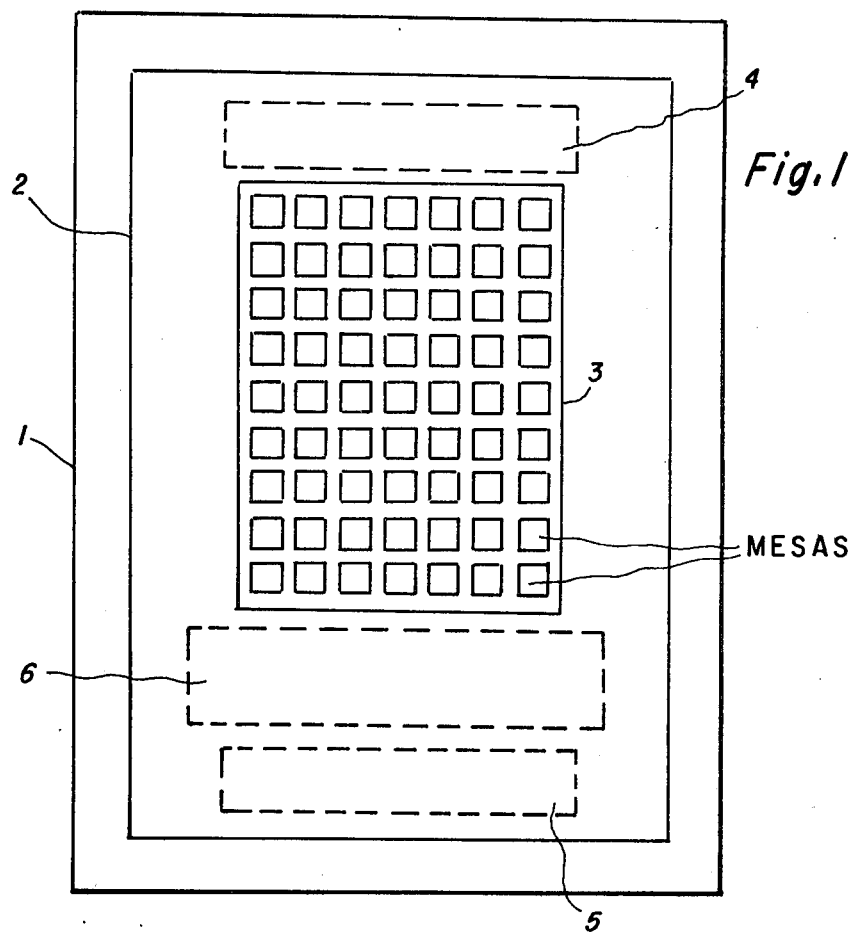
FIG. 1 illustrates a thermal printhead structure.

FIG. 1 illustrates a 7×9 heater element array of semiconductor mesas located within the window 3 over which thermally sensitive material is positioned to form a dynamic information display of the type described in U.S. Pat. No. 3,323,341, by J. W. Blair et al, in which the described thermochromic materials are used, or over which is passed a specially treated thermally sensitive material to form a permanent information display or printer of the type described in U.S. Pat. No. 3,496,333, by Emmons et al. A monocrystalline semiconductor wafer 2 is mounted on a larger insulating support 1 which may be any suitable material, for example, ceramic, glass or sapphire, by way of an insulating adhesive having good thermal and electrical insulating properties, such as epoxy.

Each heater element of the array comprises a monocrystalline semiconductor body in a mesa shape and contains a heater element formed therein at the underside of the mesa adjacent the support 1 so that when the heater element is energized, the mesa is heated to provide a localized dot on the thermally sensitive material above it. A group of selectively energized heater elements forms a group of dots on the thermally sensitive material, defining a character or information representation displayed on the thermally sensitive material. The mesas comprising the heater element array are air isolated from each other and joined by a metallic connecting pattern underneath the mesas between the semiconductor wafer 2 and the support 1. In this preferred embodiment, the interconnecting pattern is a grid comprised of x+a coincident current lines and y+b coincident current lines, each intersection occurring beneath a respective mesa so that when a signal is applied to one of the x+a lines and to one of the y+b lines, a sufficient summed signal is present to turn on the transistor heater network of that mesa.

The semiconductor wafer 2 is integral except within the window 3, in which are located the air isolated heater elements and consequently the top surface of the semiconductor wafer 2 presents a good, more uniform support for the positioning or passing of the thermally sensitive material over the heater element array.

A metallic connecting pattern located between the semiconductor wafer 2 and the support 1 extends out into bonding pads located above the opening 4 and 5 in support 1 so that external connections can be made to these bonding pads through the openings at the underside of support 1, thereby being removed from the thermally sensitive material located above the mesas. Furthermore, the metallic connecting pattern also extends and makes connection to the decoder 6 which has a further metallic pattern extending to a bonding pad located above the opening 5. A metallic connecting pattern located between the semiconductor wafer 2 and the support 1 mechanically and electrically joins the air isolated mesas and bonding pad areas and is supported in the epoxy adhesive resting between semiconductor wafer 2 and the support 1.

Figure 2:
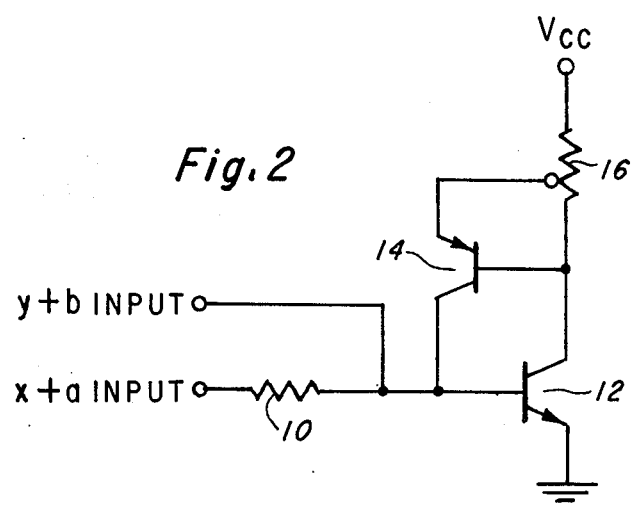
FIG. 2 is a schematic diagram of the heater network of one mesa of the thermal printhead.

The heater network located in each mesa is illustrated schematically in FIG. 2. The x+a input logic signal is coupled by resistor 10 to the base of NPN heater transistor 12. The y+b input logic signal is coupled directly to the base of transistor 12. The weighting resistor for the y+b input, corresponding to weighting resistor 10 of the x+a input, is located on the semiconductor wafer of the printhead, but not in the mesa itself. The emitter of transistor 12 is grounded while its collector is returned to a positive voltage supply $V_{cc}$ through collector resistor 16. A PNP transistor 14 has a collector which is common with the base of transistor 12 and a base which is common with the collector of transistor 12. The emitter-base junction of transistor 14 is connected across a portion of collector-resistor 16.

Operationally, during quiescent periods, one or both of the x+a and y+b input logic signals will be low and heater transistor 12 will be off. There is a weighted summation of x+a and y+b input logic signal levels at the base of transistor 12 and both inputs are required to occupy the high state to initiate turn-on of transistor 12. When both the x+a and y+b input logic levels switch to the high state, a current begins to flow in the collector circuit of transistor 12. This causes a voltage drop across the portion of resistor 16 which is coupled across the emitter-base junction of transistor 14. This voltage drop is of proper polarity to forward bias the emitter-base junction of transistor 14 and cause this transistor to conduct. The collector current in transistor 14 provides additional base drive to transistor 12, thereby causing transistor 12 to conduct more heavily. This regenerative action causes a rapid build up of the collector current in transistor 12 until the saturation state is reached. Thereafter, the regenerative action maintains transistor 12 in the conducting state independent of changes in the x+a and y+b input signal logic levels. Heater transistor 12 will cease to conduct only when the $V_{cc}$ voltage supply is turned off. It should also be noted that, as a result of the regenerative action, very little current drive is required of the x+a and y+b input signals to initiate a turn-on. Consequently, these input signals can be provided by conventional logic circuits. For a more detailed description of this latching circuit and the thermal printhead in which it is incorporated, reference should be made to U.S. Pat. No. 3,988,569 by Henrion and assigned to the assignee of this invention.

Figure 3A:
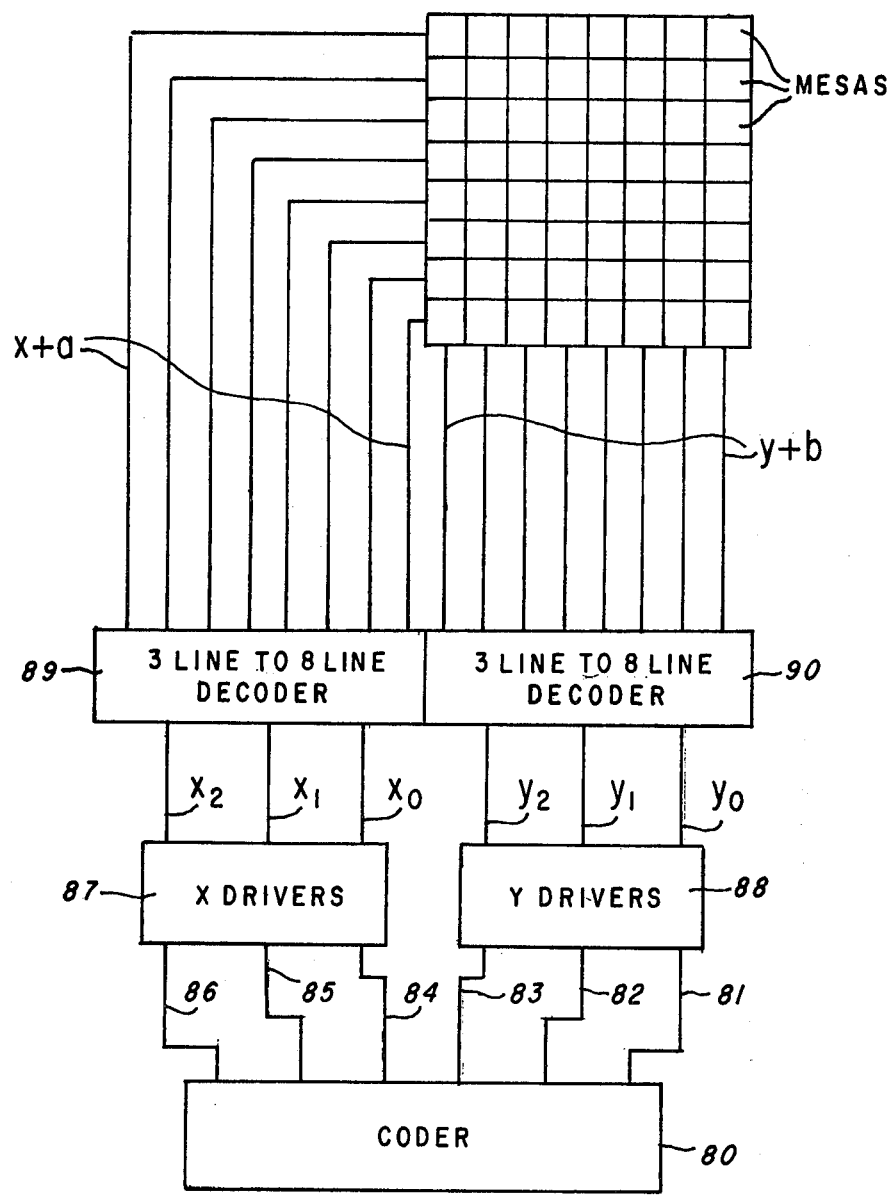
FIG. 3A is a general diagramatic representation of the connections made to the printhead.

FIG. 3A shows coder 80 supplying X drivers 87 and Y drivers 88 by way of X lines 84-86 and Y lines 81-83. X drivers 87 are connected to decoder 89 by lines X0-X2 and Y drivers 88 are connected to decoder 90 by way of lines Y0-Y2. Decoder 89 provides x+a outputs to the rows of mesas and decoder 90 provides y+b outputs to the columns of mesas.

Figure 3B:
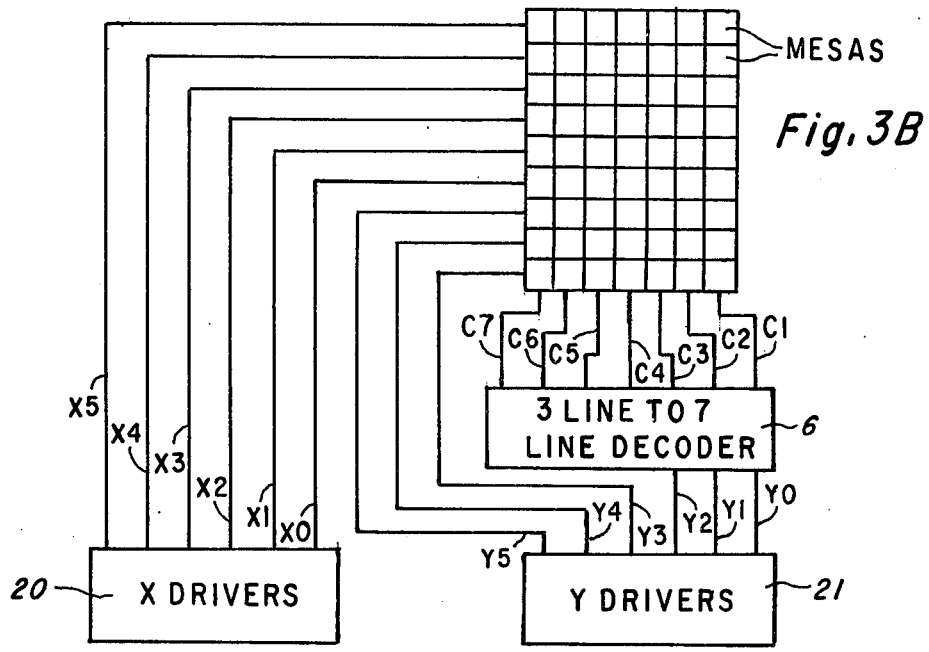
FIG. 3B is a diagrammatic representation of the connections made to the printhead in the preferred embodiment.

FIG. 3B shows x drivers 20 and y drivers 21. The inputs to these drivers come from a read-only memory (not shown) in coded signal form. Drive lines x0-x5 from x drivers 20 are all connected to the x+a coincident current lines y drive lines y3-y5 are also connected to the x+a coincident current lines and y drive lines y0-y2 are connected from y drivers 21 to the decoder 6. The decoder 6 is capable of decoding $2^3$ or 8 lines. In this particular application, only 7 lines 61-67 are necessary and they are shown as connected to the y+b coincident current lines. In this preferred embodiment, there are 9 x+a coincident current lines and 7 y+b coincident current lines to provide a total of 63 mesas which are addressable. This enables the printing of an improved font and also lends itself very well to the printing of ideograms.

Figure 4:
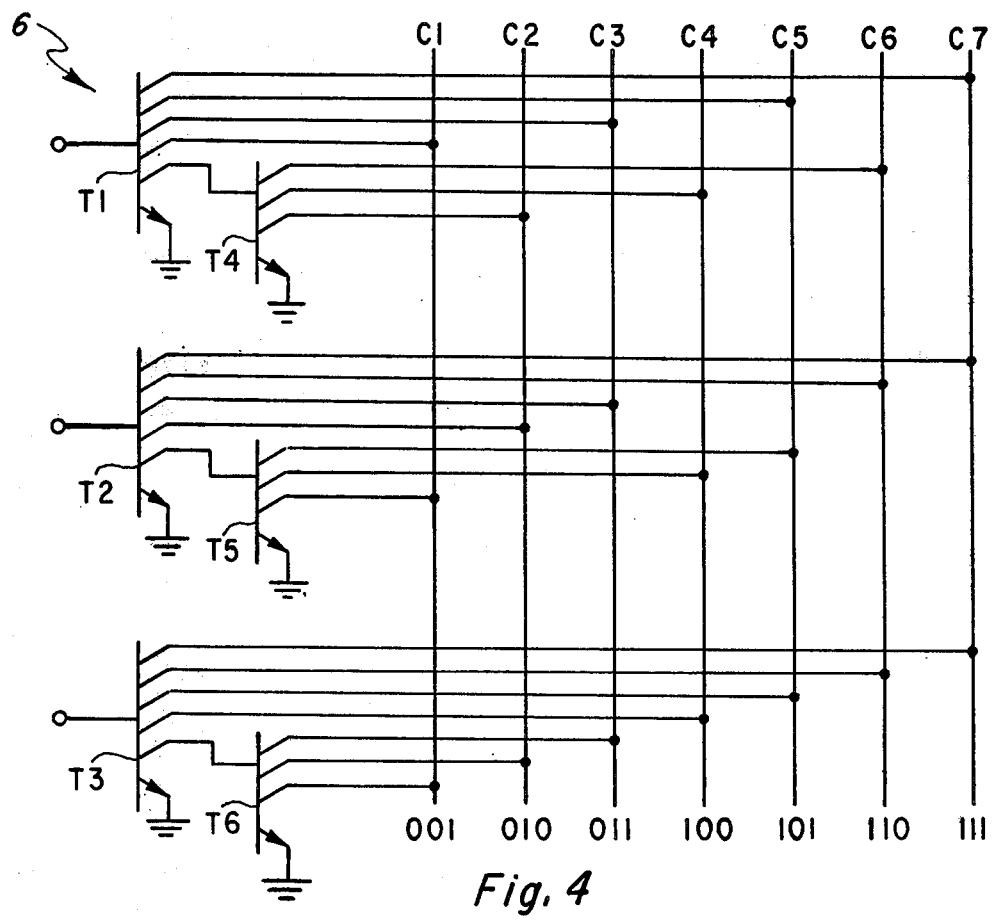
FIG. 4 is a schematic diagram of the decoder.

FIG. 4 is a schematic diagram of the decoder 6 of FIGS. 1 and 3. In this preferred embodiment, the transistors T1-T6 are of the integrated injection logic ($I^2L$) type transistor. T1 has a first collector connected to coincident line C7, a second collector connected to line C5, a third collector connected to line C3, a fourth collector connected to line C1 and a fifth collector connected to provide base drive to transistor T4. Transistor T4 has a first collector connected to line C6, a second collector connected to line C4 and a third collector connected to line C2. Transistors T1 and T4 each have their emitters grounded.

Transistor T2 has a first collector connected to line C7, a second collector connected to line C6, a third collector connected to line C3, a fourth collector connected to line C2 and a fifth collector serving as the base drive to transistor T5. Transistor T5 has a first collector connected to line C5, a second collector connected to line C4 and a third collector connected to line C1. The emitters of transistors T2 and T5 are connected to ground.

A first collector of transistor T3 is connected to line C7, a second collector is connected to line C6, a third collector is connected to line C5, a fourth collector is connected to line C4 and a fifth collector serves as a base drive for transistor T6. Transistor T6 has a first collector connected to line C3, a second collector connected to line C2, and a third collector connected to line C1. Transistors T3 and T6 have their emitters connected to ground. Transistors T1, T2 and T3 have their bases connected to lines y0, y1 and y2 of FIG. 3, respectively.

Those skilled in the art realize that the invention is not limited to the $I^2L$ type of circuitry, nor to the specific implementation shown for the decoder 6. Furthermore, the increase in size from a 5×7 matrix to a 7×9 as shown in this preferred embodiment obviously may have differing numbers. Also, it is to be understood that any size decoder could well be used, depending upon the particular requirement and a decoder could be used to decode x drive line requirements, as well as those of the y drive lines shown in this preferred embodiment.

What is claimed is:

1. A thermal printer having at least one thermal printhead for providing desired printed characters, the printhead comprised of a plurality of coincident current-activated semiconductor mesas arranged in a matrix of x+a mesas and y+b mesas, comprising:
   a. coding means for supplying coded signals to the printhead to activate selected mesas for providing desired characters;
   b. x drive lines and y drive lines for the printhead connected to the coding means;
   c. x+a coincident current lines and y+b coincident current lines formed on the printhead; and
   d. decoding means formed on the printhead having input means connected to the x drive lines and the y drive lines, and output means connected to the x+a coincident current lines and the y+b coincident current lines for decoding the coded signals and for causing the desired coincident current lines to be selected in accordance with the coded signals.

2. The thermal printer of claim 1 wherein the decoding means comprises an array of switches.

3. The thermal printer of claim 2 wherein the coding means comprises a read-only memory.

4. The thermal printer of claim 2 wherein the array of switches comprises integrated injection logic (I$^2$L) transistor circuits.

5. The thermal printer of claim 3 wherein the array of switches comprises integrated injection logic (I$^2$L) transistor circuits.

6. The thermal printer of claim 5 wherein $x+a=7$, $y+b=9$, and $a=b=2$, and the decoder means is a three line to seven line decoder.

7. A thermal printhead having a plurality of semiconductor mesas, each mesa having a latching heater circuit for providing a hot spot at the surface of the mesa, the latching heater circuit being responsive to signals impressed on a pair of coincident-current lines comprising:
   a. a read-only memory for supplying coded signals to the printhead to activate selected mesas for providing desired characters;
   b. x drive lines and y drive lines for the printhead connected to the coding means;
   c. $x+a$ coincident current lines and $y+b$ coincident current lines formed on the printhead; and
   d. an integrated injection logic (I$^2$L) transistor decoder array, formed on the printhead having input lines connected to the x drive lines and the y drive lines, and output lines connected to the $x+a$ coincident current lines and the $y+b$ coincident current lines for decoding the coded signals and for causing the desired coincident current lines to be selected in accordance with the coded signals.

* * * * *